Patented May 29, 1934

1,960,275

UNITED STATES PATENT OFFICE 1,960,275

PRODUCTION OF ACIDYL-2.4.6-TRIBROMANILIDES

Brian Edward Merriman Miller, London, England, assignor to Celanese Corporation of America, a corporation of Delaware No Drawing. Application March 26, 1930, Serial No. 439,225. In Great Britain May 29, 1929

6 Claims. (Cl. 260—124)

This invention relates to the production of a substantially pure acidyl 2.4.6-tribromanilides.

In U. S. Patent application S. No. 366,100 filed 25th May, 1929 processes are described for the production of noninflammable compositions or compositions of reduced inflammability, which compositions have a basis of cellulose acetate or other cellulose esters or ethers. The said processes consist in incorporating in the compositions one or more brom-derivatives of acidylated aromatic amines. In particular the said specification describes the incorporation of 2.4.6-tribrom mono or di-acetanilide in the compositions.

In the production of these compositions of matter containing acidylated tribromanilines it is important that the brom-derivatives employed should be in as pure a state as possible, since not only will they impart any colour they possess to the composition, but in addition impurities appear to promote decomposition with consequent ill effects on the finished product. When the compositions are to be employed for the manufacture of cinematographic or photographic films or for other purposes in which light has to be transmitted through a transparent sheet, it becomes a matter of utmost importance that not only should the composition be substantially colourless but that it should remain so under the conditions to which it will be submitted while in use.

Acidyl derivatives of tribromaniline such as the tribrom mono and di-acetanilides are compounds which are very difficult to obtain commercially in a sufficiently pure state for use in the manufacture of cinematographic and photographic films. Thus, crude tribromdiacetanilide purified by precipitation from alcohol, acetone, or mixed alcohol-acetone solutions by means of water is still slightly coloured and tends to become more so with time. Purification by means of fuller's earth, or by steam distillation using steam heated to 200° C. is no more successful than precipitation for giving a product of the requisite purity characteristics. Sublimation under normal or reduced pressures also gives a slightly coloured product. Acetylation of pure tribromaniline prepared by bromination in HCl solution of freshly distilled aniline by means of a mixture of potassium bromate and bromide can give a substantially white product having the melting point of the pure body. Nevertheless, a cellulose derivative composition containing this product tends to discolour under the action of light.

The surprising observation has now been made that although sublimation of tribromdiacetanilide does not give a product which will stand up to all the conditions required of it when employed in transparent sheets, and although tribromaniline purified by the methods referred to above does not on acetylation give a product which will stand up to these conditions, yet, if 2.4.6-tribromaniline be subjected to sublimation, it can then be acetylated to give acetyl derivatives substantially white and of greatly improved stability to the action of light when incorporated in a cellulose derivative composition.

According to the present invention therefore, 2.4.6-tribromaniline is purified by sublimation. The sublimed product is then used for the manufacture of substantially pure, stable acidyl derivatives.

The actual sublimation may be carried out by simple heating and condensation of the vapours produced. Preferably however the vaporization of the tribromaniline is effected in a current of air or other inert gas, which may be sucked or blown through the apparatus. The air or other inert gas may be heated so as to provide the whole or part of the heat necessary for the vaporization of the tribromaniline and may, after passing through suitable settling chambers or traps, be recirculated through the apparatus so as to provide a continuous cycle. The condensation of the vapours may be conducted in settling chambers with or without the aid of screens, or the vapours may be passed through a liquid trap, for example a water trap. While the temperature of the vaporization may be varied between wide limits, for example 130° to 180° C., it is preferred to use a temperature of about 160°–165° C.

The mono and diacetyl derivatives of tribromaniline may be prepared from the substance purified as above described by acetylation. Thus, for example, the tribromaniline may be treated with acetyl chloride or other acetyl halide to obtain the 2.4.6-tribrom-mono-acetanilide or may be refluxed with an excess of acetic anhydride to obtain the 2.4.6-tribromdiacetanilide. In the latter case, the acetylation may, if desired, take place in the presence of fuller's earth or other decolourizing agent. After acetylating, the anhydride solution may be filtered, mixed with glacial acetic acid and the tribromdiacetanilide precipitated by pouring the solution into water. The tribromacetanilide so prepared is found to be much purer than a product obtained by purification of the crude diacetyl product obtainable by acetylation of a crude tribromaniline, and may be obtained with a melting point as high as 124° C. with practically no further purification.

When incorporated in compositions of matter containing cellulose acetate or other cellulose derivatives, the purified tribromdiacetanilide produces comparatively no discolouration. It may be employed in quantities of as much as 10% of the cellulose derivative present in order to reduce inflammability, and shows no signs of freezing out of the mass even after exposure to temperatures below 0° C. for considerable periods.

While as indicated above, the invention particularly aims at the manufacture of tribromdiacetanilide, it comprises broadly the purification of 2.4.6.-tribromaniline and the production therefrom of any of its acidyl derivatives.

What I claim and desire to secure by Letters Patent is:—

1. A process for the production of substantially pure, stable acidyl-2.4.6-tribromanilides comprising acidylating sublimed 2.4.6-tribromaniline.

2. A process for the production of substantially pure, stable 2.4.6-tribromdiacetanilide comprising acetylating sublimed 2.4.6-tribromaniline with acetic anhydride.

3. Process for the production of substantially white acidyl-2.4.6.-tribromanilides which are stable to light, comprising subliming 2.4.6.-tribromaniline and acidylating the product thus obtained.

4. Process for the production of a substantially white 2.4.6.-tribromdiacetanilide which is stable to light, comprising subliming 2.4.6.-tribromaniline, and acetylating the sublimed product.

5. Process for the production of substantially white acidyl-2.4.6.-tribromanilides which are stable to light, comprising subliming 2.4.6.-tribromaniline at a temperature of 160–165° C. and acidylating the product thus obtained.

6. Process for the production of a substantially white 2.4.6.-tribromdiacetanilide which is stable to light, comprising subliming 2.4.6.-tribromaniline at a temperature of 160–165° C. and acetylating the sublimed product.

BRIAN EDWARD MERRIMAN MILLER.